United States Patent
Carter et al.

(10) Patent No.: US 11,771,006 B2
(45) Date of Patent: Oct. 3, 2023

(54) PLANT PRODUCT HARVESTING MACHINE FEEDERHOUSE

(71) Applicant: Monsanto Technology LLC, St. Louis, MO (US)

(72) Inventors: Edward V. Carter, St. Louis, MO (US); Gregory T. Rich, Jr., St. Louis, MO (US); David J. Schleeper, St. Louis, MO (US)

(73) Assignee: MONSANTO TECHNOLOGY LLC, St. Louis, MO (US)

( * ) Notice: Subject to any disclaimer, the term of this patent is extended or adjusted under 35 U.S.C. 154(b) by 508 days.

(21) Appl. No.: 16/917,288

(22) Filed: Jun. 30, 2020

(65) Prior Publication Data

US 2021/0000015 A1    Jan. 7, 2021

Related U.S. Application Data

(60) Provisional application No. 62/869,991, filed on Jul. 2, 2019.

(51) Int. Cl.
*A01D 34/04* (2006.01)
*A01D 34/00* (2006.01)
(Continued)

(52) U.S. Cl.
CPC .......... *A01D 61/008* (2013.01); *A01D 61/04* (2013.01)

(58) Field of Classification Search
CPC .. A01D 41/1217; A01D 41/14; A01D 75/187; A01D 61/00–04; A01D 61/008
See application file for complete search history.

(56) References Cited

U.S. PATENT DOCUMENTS

| | | | |
|---|---|---|---|
| 2,828,853 A | 4/1958 | Hart | |
| 3,516,530 A * | 6/1970 | Braet | A01D 87/00 198/728 |

(Continued)

FOREIGN PATENT DOCUMENTS

WO    850002831 A1    7/1985

OTHER PUBLICATIONS

International Search Report to Corresponding PCT/US2020/040321 dated Sep. 28, 2020.
(Continued)

*Primary Examiner* — Adam J Behrens
(74) *Attorney, Agent, or Firm* — Sandberg Phoenix & von Gontard PC

(57) ABSTRACT

A harvesting machine feederhouse that comprises an outer body connectable to and between a head unit and a thresher of the machine. The feederhouse additionally comprises a liner disposed across a bottom surface of the outer body, and at least one conveyor rotatably disposed within the outer body for conveying harvested plant product received from the head unit along the liner into the thresher. Each conveyor includes a first guide, a second guide, a pair of conveyor transports that extend between, and are disposed around, the first guide and the second guide. Each conveyor additionally includes a plurality of plant product sweeps disposed across and connected to the transports. Each sweep is sized to contact the liner as the conveyor transports are rotated around the first guide and second guide, thereby conveying plant product received from the head unit along the liner into the thresher.

13 Claims, 10 Drawing Sheets

(51) Int. Cl.
*A01D 61/00* (2006.01)
*A01D 61/04* (2006.01)

(56) References Cited

U.S. PATENT DOCUMENTS

| | | | | |
|---|---|---|---|---|
| 3,943,939 | A * | 3/1976 | Rowland-Hill | A01F 12/10 |
| | | | | 460/70 |
| 4,787,400 | A | 11/1988 | Tanis | |
| 5,478,277 | A * | 12/1995 | Kloefkorn | A01D 61/008 |
| | | | | 474/207 |
| 10,131,501 | B1 * | 11/2018 | Kopf | A01F 12/46 |
| 11,089,729 | B2 * | 8/2021 | Walker | A01D 45/023 |
| 2014/0102863 | A1 * | 4/2014 | Farley | B60P 1/36 |
| | | | | 198/732 |
| 2016/0037724 | A1 | 2/2016 | Rittershofer et al. | |
| 2016/0100525 | A1 | 4/2016 | Veikle et al. | |
| 2017/0258009 | A1 * | 9/2017 | Heyns | A01D 61/02 |
| 2018/0279553 | A1 * | 10/2018 | Peters | A01D 41/12 |

OTHER PUBLICATIONS

Written Opinion to Corresponding PCT/US2020/040321 dated Sep. 28, 2020.

* cited by examiner

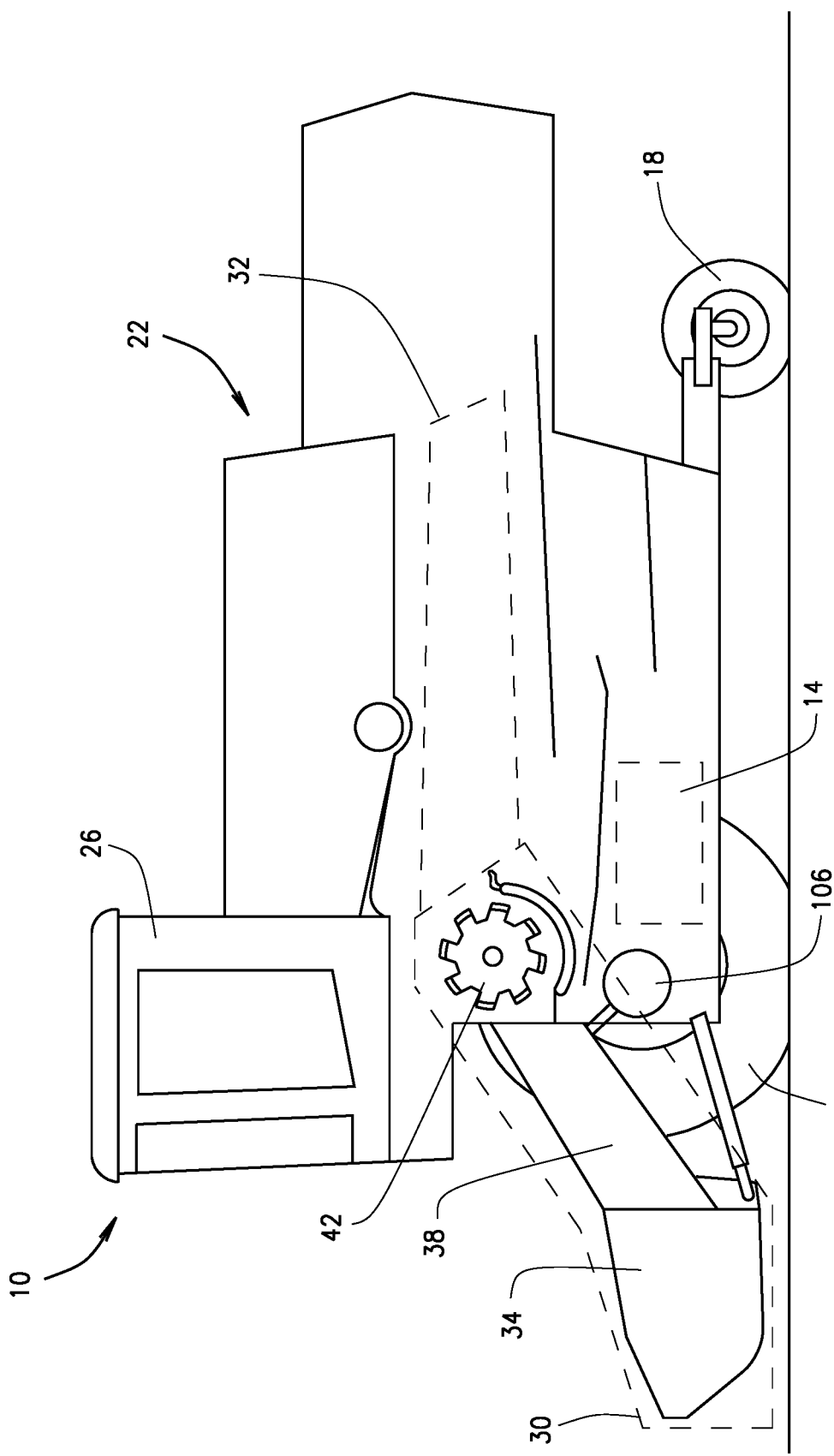

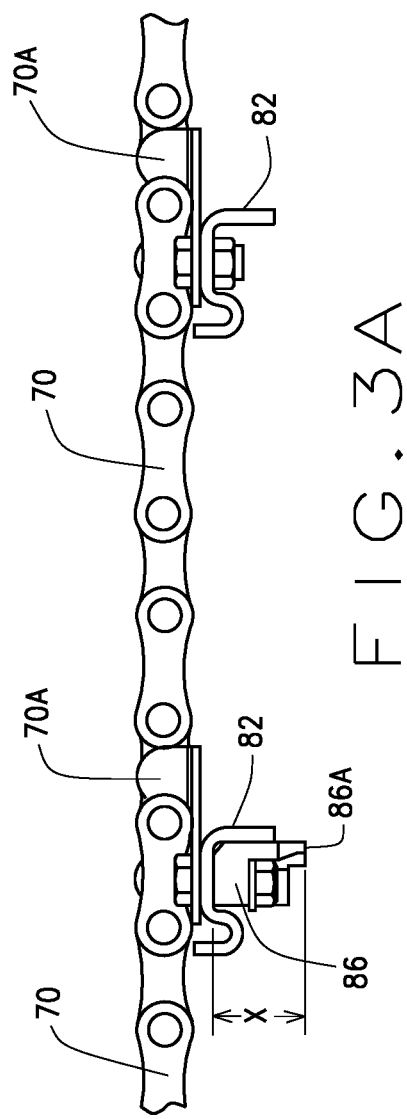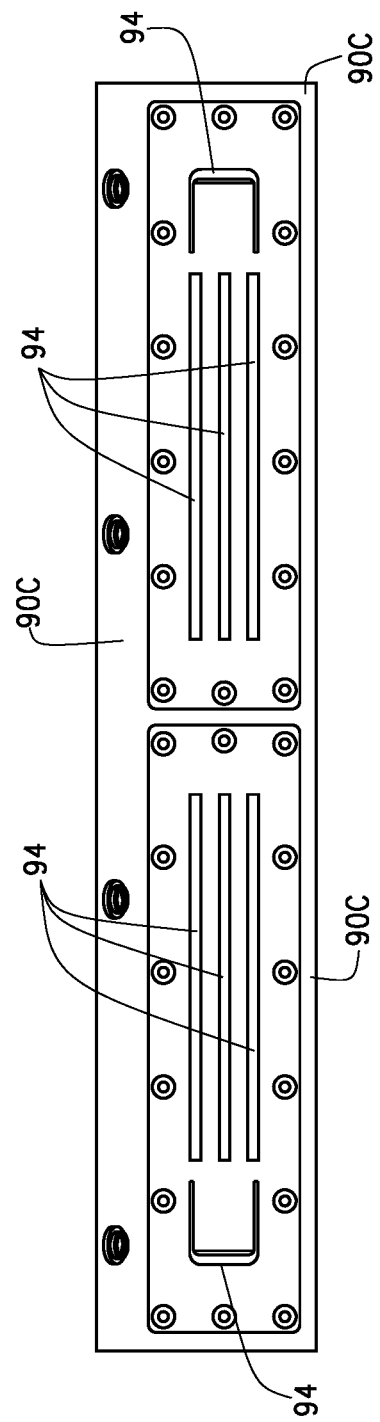

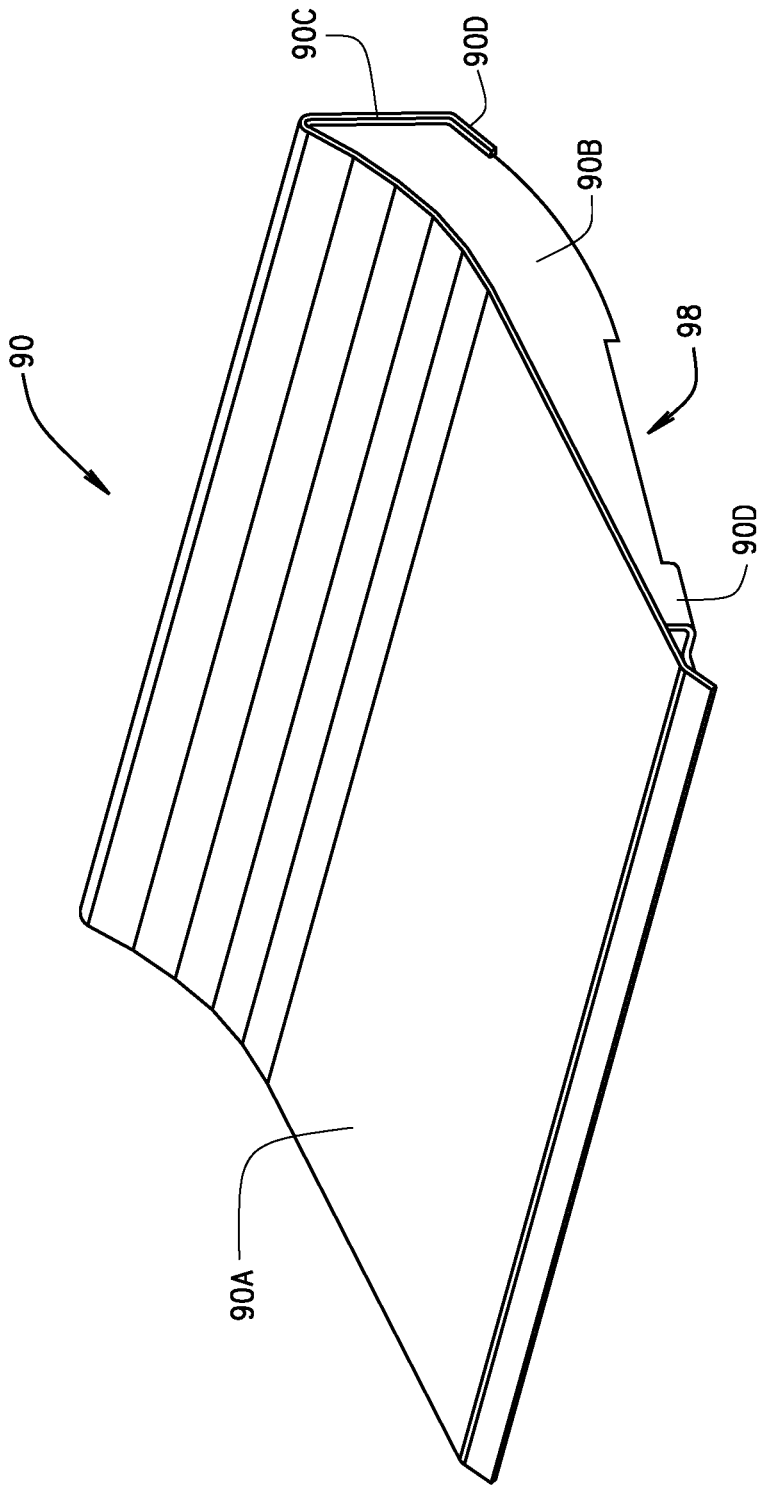

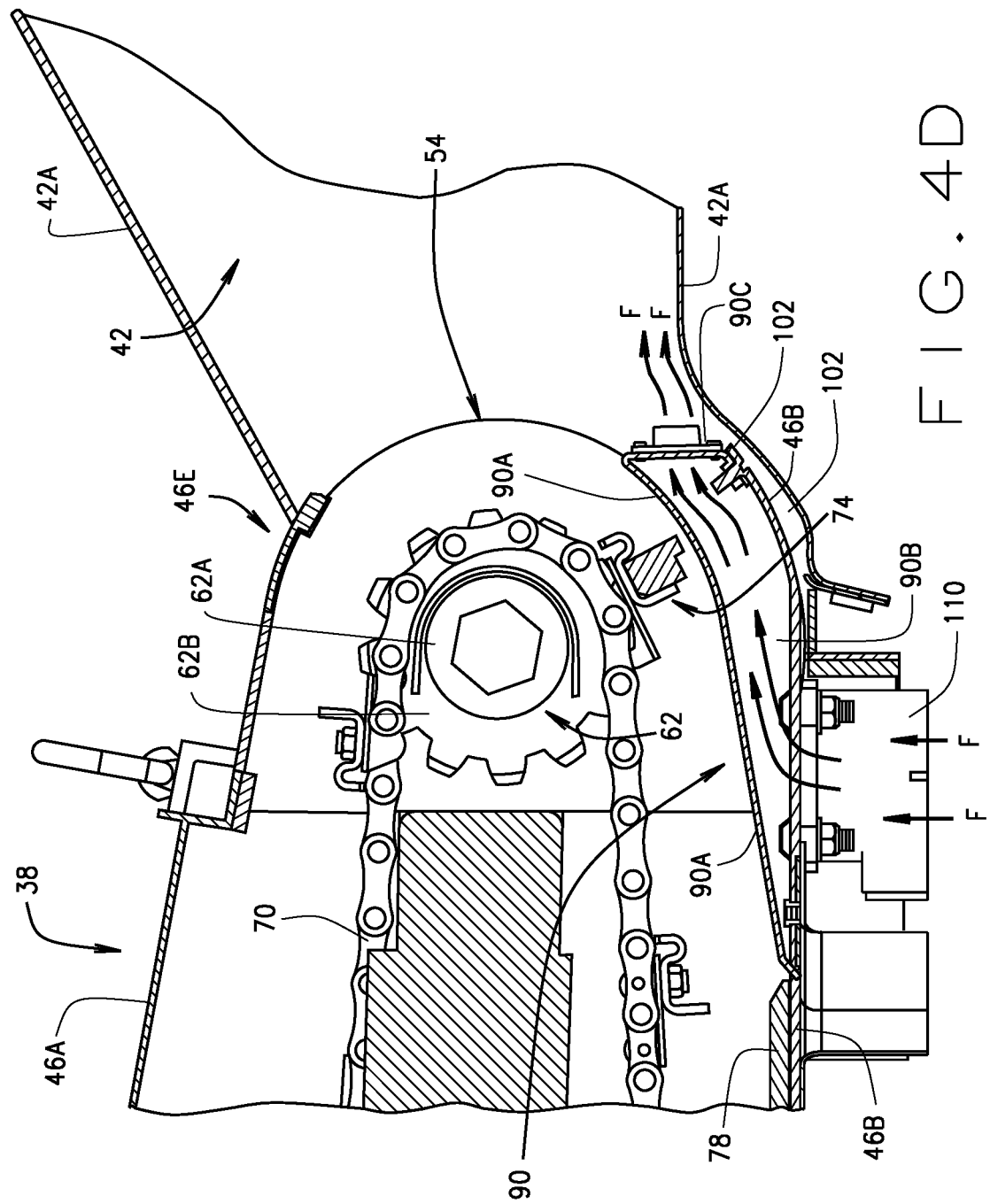

PLANT PRODUCT HARVESTING MACHINE FEEDERHOUSE

CROSS-REFERENCE TO RELATED APPLICATIONS

This application claims the benefit of U.S. Provisional Application No. 62/869,991, filed on Jul. 2, 2019. The disclosure of the above application is incorporated herein by reference in its entirety.

FIELD

The present teachings relate to systems and methods for harvesting plant product, such as corn, from a plurality of test plots without comingling the plant product harvested from the test plots.

BACKGROUND

The statements in this section merely provide background information related to the present disclosure and may not constitute prior art.

The feederhouse of a combine is a section of the machine that conveys corn ears (or other plant product) from the head unit of the combine, which hangs from the front of the combine, more particularly from the front of the feederhouse, near the ground, up to the thresher which is disposed on the main chassis of the combine. After the head unit strips the ears/plant product from the stalks, the ears/plant product are pushed to the center of the head unit and into the front of the feederhouse, where slats connected by chains push the ears/plant product through the feederhouse to the thresher. More specifically, the ears/plant product are conveyed from the front entrance of the feederhouse up to the rear of the feederhouse by slats that span loops of chains which are turned by the combines engine. Hence, during operation, the ears/plant products are fed into the feederhouse where the slats force the ears/plant product to slide along the bottom of an angled floor of the feederhouse up to the thresher.

A commercial combine is one designed to harvest and combine grain on production farms, i.e. where large numbers of plants are harvested en mass with little regard for keeping grain from certain plants separate from the grain of other plants. Many research combines are commercial combines modified for harvesting many short research/test plots with the goal of preventing comingling of the plant product, e.g., keeping the grain collected from one test plot separate from the grain harvested from other test plots, so that the performance of each test plot can be scientifically analyzed and compared. More particularly, the feederhouses of commercial combines are not good at keeping the seed from one plot separate from the seed of other plots. Commercial combines normally depend upon subsequently harvested plant material to assist the conveyor to transport loose kernels and small ears of corn into the thresher Some reasons for this are: 1) there is typically 3.5-4.0 inches of space between the feederhouse slats and the angled bottom floor of the feederhouse, which permits loose kernels and even small ears to fall behind and be intermixed with the product harvested from other plots; and 2) Kernels can get stuck in the corners and edges of the chute, or outer body, of the feederhouse where the slats are unable to reach, particularly in a gap at the junction between the feederhouse and the frame of the thresher. These kernels can become dislodged later and mix with the kernels of other plots.

SUMMARY

This innovation improves how the feederhouse of a plant product harvesting machine conveys seed from the head to the thresher.

In various embodiments, the preset disclosure provides a feederhouse for a plant product harvesting machine, wherein the feederhouse comprises an outer body having a head end connectable to a head unit of the plant product harvesting machine and an opposing thresher end connectable to a thresher of the plant product harvesting machine. The head end comprises an ingress opening structured and operable to allow harvested plant product to pass from the head unit into the outer body, and the thresher end comprises an egress opening structured and operable to allow plant product to pass from within the outer body into the thresher. The feederhouse additionally comprises a liner disposed across a bottom surface of the outer body, and at least one conveyor rotatably disposed within the outer body and structured and operable to the convey harvested plant product received from the head unit via the ingress opening along the liner into the thresher via the egress opening. Each conveyor includes a first guide, a second guide, a pair of conveyor transports that extend between, and are disposed around, the first guide and the second guide. Each conveyor additionally includes a plurality of plant product sweeps disposed across and connected to the transports. Each sweep is sized to contact the liner as the conveyor transports, and hence the sweeps, are rotated around the first guide and second guide, thereby conveying plant product received from the head unit into the thresher.

In various other embodiments, the present disclosure provides a plant product harvest and transport system for a plant product harvesting machine, wherein the system comprises a head unit structured and operable to harvest plant product from plants growing in a field (e.g., a test plot), a thresher structured and operable to receive the harvested plant product and remove plant product seed from the remainder of the harvested plant product, and a feederhouse structured and operable to convey the harvested plant product from the head unit to the thresher. The feederhouse comprises an outer body having a head end connectable to the head unit and an opposing thresher end connectable to the thresher. The head end comprises an ingress opening structured and operable to allow harvested plant product to pass from the head unit into the outer body, and the thresher end comprises an egress opening structured and operable to allow plant product to pass from within the outer body into the thresher. The feederhouse additionally comprises a liner disposed across a bottom surface of the outer body, and at least one conveyor rotatably disposed within the outer body and structured and operable to convey harvested plant product received from the head unit via the ingress opening along the liner into the thresher via the egress opening. Each conveyor includes a first guide, a second guide, a pair of conveyor transports that extend between, and are disposed around, the first guide and the second guide. Each conveyor additionally includes a plurality of plant product sweeps disposed across and connected to the transports. Each sweep is sized to contact the liner as the conveyor transports, and hence the sweeps, are rotated around the first guide and second guide, thereby conveying plant product received from the head unit into the thresher.

In yet other various embodiments, the present disclosure provides a plant product harvesting machine that comprises at least one plant product seed/chaff separation system structured and operable to segregate plant product seed from plant product chaff, and at least one plant product harvest and transport system structured and operable to harvest the plant product and transport the harvested plant product to the at least one seed/chaff separation system. Each plant product harvest and transport system comprises a head unit structured and operable to harvest plant product from plants growing in a field (e.g., a test plot), a thresher structured and operable to receive the harvested plant product and remove plant product seed from the remainder of the harvested plant product, and a feederhouse structured and operable to convey the harvested plant product from the head unit to the thresher. The feederhouse comprises an outer body having a head end connectable to the head unit and an opposing thresher end connectable to the thresher. The head end comprises an ingress opening structured and operable to allow harvested plant product to pass from the head unit into the outer body, and the thresher end comprises an egress opening structured and operable to allow plant product to pass from within the outer body into the thresher. The feederhouse additionally comprises a liner disposed across a bottom surface of the outer body, and at least one conveyor rotatably disposed within the outer body and structured and operable to the convey harvested plant product received from the head unit via the ingress opening along the liner into the thresher via the egress opening. Each conveyor includes a first guide, a second guide, a pair of conveyor transports that extend between, and are disposed around, the first guide and the second guide. Each conveyor additionally includes a plurality of plant product sweeps disposed across and connected to the transports. Each sweep is sized to contact the liner as the conveyor transports, and hence the sweeps, are rotated around the first guide and second guide, thereby conveying plant product received from the head unit into the thresher.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

FIG. 1 is a side view of plant product harvesting machine including at least one plant product harvest and transport system, in accordance with various embodiments of the present disclosure.

FIG. 3A is a side view of a portion of a conveyor system transport shown in FIGS. 2A through 2D illustrating a plant product sweep of the conveyor system connected to the transport, in accordance with various embodiments of the present disclosure.

FIG. 4A is an isometric view of a feederhouse plenum, in accordance with various embodiments of the present disclosure.

FIG. 4B is a front view of the plenum shown in FIG. 4A illustrating a plurality of air output vents, in accordance with various embodiments of the present disclosure.

Figure 2A:
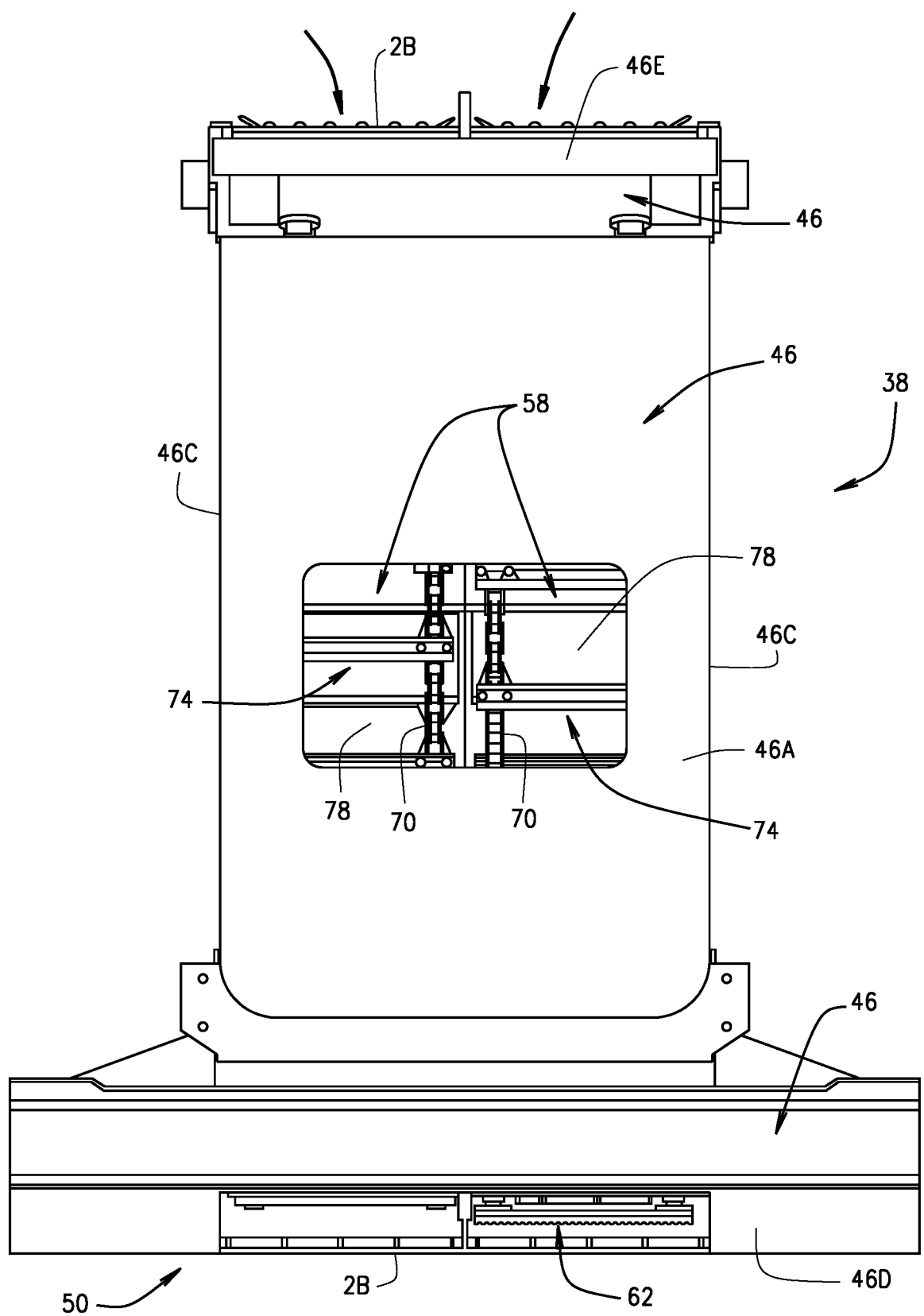
FIG. 2A is a top view of a feederhouse of the at least one plant product harvest and transport system shown in FIG. 1 having certain sections exemplarily removed to show at least one conveyor disposed within the feederhouse, in accordance with various embodiments of the present disclosure.

FIG. 4D the cross-sectional view of a thresher end of the feederhouse including the plenum attached to a thresher housing, in accordance with various embodiments of the present disclosure.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on", "engaged to or with", "connected to or with", or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on", "directly engaged to", "directly connected to", or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between", "adjacent" versus "directly adjacent", etc.).

As used herein the phrase "operably connected to" will be understood to mean two are more elements, objects, devices, apparatuses, components, etc., that are directly or indirectly connected to each other in an operational and/or cooperative manner such that operation or function of at least one of the elements, objects, devices, apparatuses, components, etc., imparts are causes operation or function of at least one other of the elements, objects, devices, apparatuses, components, etc. Such imparting or causing of operation or function can be unilateral or bilateral.

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

As used herein, a test plot will be understood to mean a single field, or one of a plurality plots within a research field that has been subdivided into a plurality of plots. Each test plot typically comprises one or more rows of plants comprising from about 5 to about 15 or 20 or more plants in each row, wherein the plants are subject to various crop breeding and analytics research procedures and tests for developing various strains, hybrids, genotypes, etc. of plants. For example, test plots in a growing area can receive certain treatments (e.g. chemical applications to the plants and/or growing environment), and/or can comprise plants of certain genetics, and/or combinations thereof. Each test plot within a field is purposely separated from other test plots by a gap, or alleys, where no plants are grown. The gaps or alleys maintain the identity of the plant material within each respective test plot. Hence, there are typically many alleys in a research field, often comprising several inches to several feet of space with no plants.

As used herein, the term 'plant product' will be understood to mean grain, seed or other plant product exemplarily including oilseeds, cereals and legumes such as wheat, corn, rye, soybeans, sorghum, oats, rice, millet, canola, and any other seed or plant product collected from a plant, and seeds that are still attached to tissues of the mother plant that bore them (e.g., cotton). Additionally, as used herein, a test plot will be understood to mean a single field, or one of a plurality plots within a research field that has been subdivided into a plurality of plots. Each test plot typically comprises one or more rows of plants comprising from about 5 to about 15 or 20 plants (or more) in each row, wherein the plants are subject to various crop breeding and analytics research procedures and tests for developing various strains, hybrids, genotypes, etc. of plants. For example, test plots in a growing area can receive certain treatments (e.g. chemical applications to the plants and/or growing environment), and/or can comprise plants of certain genetics, and/or combinations thereof. Each test plot within a field can be purposely separated from other test plots by a gap, or alleys, where no plants are grown. The gaps or alleys maintain the identity of the plant material within each respective test plot. Hence, there are typically many alleys in a research field.

As used herein the term plant product will be understood to mean the product derived from or produced by a plant. For example, the tissues or structures of the plant such as the flower, fruit, seed, grain, leaves, stems etc., produced by the plant. For example, ears of corn from corn plants, seed cotton (or cotton bolls) from cotton plants, soy bean pods from soy plants, canola seeds from canola plants, wheat grain from wheat plants, or the leaves, stems, vegetables, seeds, grains, etc., from any other plant.

As used herein the term chaff will be understood to mean the remainder of the harvested plant product after the seed has been removed therefrom.

Referring to FIG. 1, in various embodiments, the present disclosure provides a plant product harvesting machine 10 (e.g., corn, wheat, soybeans, sorghum, canola or other plant harvesting combine) that is structured and operable to traverse a plot comprising a plurality of plants (exemplarily a test or research plot of plants), whereby the machine 10 harvests the plant product from the plurality of plants in the plot, separates the plant product seed from the remainder of the harvested plant product (e.g., separates the corn kernels from the corn cobs), thereby producing plant product seed mixed with plant product chaff, segregates the plant product seed from the plant product chaff, and deposits the segregated plant product seed in a storage bin, vessel, compartment, vehicle or container, or otherwise disposes of the seed and/or chaff. Alternatively, in various embodiments, the harvesting machine 10 can be structured and operable to analyze the segregated seed (e.g., perform any desired genotype and/or phenotype testing and/or analysis) and then simply discharge the segregated plant product seed and chaff back onto the ground.

Generally, the plant product harvesting machine 10 comprises a primer mover (e.g., in internal combustion engine) 14 structured and operable to provide motive power/torque to one or more wheel 18, a main chassis and body 22 structured and operable to support and/or house various systems, subsystems, structures, mechanisms, apparatus, devices, etc., of the machine 10, and an operator cab 26 structured and operable to provide an enclosure for an operator and various machine control panels, systems, and devices for controlling operation of the machine. The machine 10 additionally comprises at least one plant product harvest and transport system 30 structured and operable to harvest the plant product and transport the harvested plant product to at least one seed/chaff separation system 32 structured and operable to segregate plant product seed from plant product chaff.

It is envisioned that in various embodiments, operation of the machine 10 can be wholly or at least partially controlled by an operator within in the cab 26, while in other embodiments operation of the machine 10 can be wholly or at least partially automated.

As described above, the machine 10 includes one or more plant product harvest and transport system 30. For example, in various instances the machine 10 can include 1 to 12 plant product harvest and transport systems 30. Each plant product harvest and transport system 30 generally comprises a head unit 34, a feederhouse 38 and a thresher 42. Each head unit 34 can be any known or unknown head unit that is structured and operable to harvest the plant product from plants growing in one or more plot (e.g., one or more test/research plot) of a field as the machine 10 traverses the plot(s) and field. For example, in various instances each head unit 34 can be structured and operable to harvest the ears of corn from corn stalks growing in one or more test/research plot as the machine 10 traverses the plot(s). Each feederhouse 38 is structured and operable to convey the harvested plant product from the respective head unit 34 to the respective thresher 42. For example, in various instances, each feederhouse 38 is structured and operable to convey harvested ears of corn from the respective head unit 34 to the respective thresher 42. Each thresher 42 is structured and operable to receive the harvested plant product and separate plant product seed from the remainder of the harvested plant product, thereby producing seed mixed with plant product chaff.

As described above the term chaff will be understood to mean the remainder of the harvested plant product after the seed has been removed therefrom. For example, in various instances each thresher 42 is structured and operable to receive the harvested ears of corn and separate the corn kernels from the cob, thereby producing corn kernels mixed with corn chaff. Although the machine 10, the plant product harvest and transport system(s) 30, and the various other systems, subsystems, structures, mechanisms, apparatus, devices, etc., disclosed herein are often exemplarily described with regard to the plant product being corn, it should be understood that the machine 10, the plant product harvest and transport system(s) 30, and the various other systems, subsystems, structures, mechanisms, apparatus, devices, etc., of the harvesting machine 10 disclosed herein are equally applicable to use and implementation with various other grain, seed or other plant product exemplarily including oilseeds, cereals and legumes such as wheat, corn, rye, soybeans, sorghum, oats, rice, millet, canola, cotton, etc.

Referring now to FIGS. 1, 2A, 2B, 2C and 2D, as described above, each feederhouse 38 is structured and operable to convey the harvested plant product from the head unit 34 to the thresher 42. In various embodiments, each feederhouse 38 comprises an outer body 46 including a top 46A, bottom 46B, opposing sides 46C, a head end 46D and a thresher end 46E. The head end 46D is connectable to the respective head unit 34 and includes an ingress opening 50 that is structured and operable to allow the harvested plant product to pass from the head unit 34 into the outer body 46. The opposing thresher end 46E is connectable to the thresher 42 and includes an egress opening 54 that is structured and operable to allow the plant product to pass from within the outer body 46 into the thresher 42. The feederhouse 38 additionally comprises at least one conveyor system 58 that is rotatably disposed within the outer body 46. Each conveyor system 58 is structured and operable to convey the harvested plant product received from the head unit 34, via the ingress opening 50, through the feederhouse 38 and into the thresher 42, via the egress opening 54. Each conveyor system 58 comprises a first rotating guide 62 (e.g., a rotating barrel, or roller) disposed near the thresher end 46E of the feederhouse 38, a second rotating guide 66 (e.g., a rotating barrel, or roller) disposed near the head end 46D of the feederhouse 38, one or more conveyor transports 70 extending between, and disposed around, the first guide 62 and the second guide 66 and a plurality of plant product sweeps 74 disposed across and connected, or secured, to the transport(s) 70. One or both of the first and second guides 62 and 66 can be driven by a motor or other drive source (not shown) to rotate the conveyor transport(s) 70 around the first and second guides 62 and 66. Alternatively, One or both of the first and second guides 62 and 66 can be passive (i.e., not driven) and the respective conveyor system 58 can include an alternate drive source (not shown) structured and operable to rotate the conveyor transport(s) 70 around the first and second guides 62 and 66.

In various embodiments, each feederhouse 38 can additionally comprise one or more liner 78 disposed across, and/or in various instances mounted to, an interior surface of the bottom 46B of the outer body 46. Each liner 78 has desired thickness (e.g., 0.3-1.5 cm) and can be fabricated of any desired material. In various embodiments, the liner(s) 78 can be fabricated from a low friction, low abradable (e.g., abrasion resistant) material such as an ultra-high molecular weight (UHMW) polyethylene, PTFE (polytetrafluoroethylene), or polyimides such as PEEK, PPS, Nylon, Acetal and Polyester. In various instances wherein at least one of the first and second guides 62 and 66 can be driven, the first guide 62 can be driven and disposed near the thresher end 46E of the feederhouse 38, and the second guide 66 can be passive and disposed near the head end 46D of the feederhouse 38. Although the liner 78 is exemplarily described and illustrated as panel, plate, slab, board or substrate that is disposed across and/or mounted to the interior surface of the bottom 46B of the outer body 46, it is envisioned that in various embodiments, the liner 78 can be mounted to the interior surface of the bottom 46B via standoffs such that the liner 78 is mounted separated from and adjacent to the interior surface of the bottom 46B. As another alternative, it is envisioned that in various embodiments the liner 78 can be a layer of material that is sprayed, painted or vapor deposition coated on the interior surface of the bottom 46B or other panel, plate, slab, board or substrate that is mounted to the interior surface of the bottom 46B.

In various embodiments, the first guide 62 can be operably connected to a drive source (e.g., a motor, or the prime mover 14) whereby the drive source is operable to controllably rotate the first guide 62 about a longitudinal axis thereof at a controllable speed and time duration. In such embodiments, the second guide 66 can be mounted within the feederhouse 38 such that the second guide 66 can freely rotate about a longitudinal axis thereof. As the first guide 62 controllably rotates (as driven by the drive source) the first guide 62 causes the transport(s) 70 and sweeps 74 mounted thereto to rotate around and between the first guide 62 and the second guide 66, such that the sweeps 74 are rotated along the length of the feederhouse 38 below and between the first and second guides 62 and 66, then around the first guide 62, then along the length of the feederhouse above and between the first and second guides 62 and 66, and then around the second guide 66. Alternatively, the transport(s) 70 can be rotated around the first and second guides 62 and 66 via any suitable drive source (e.g., not the first and/or second guides 62 and 66) that is structured and operable to rotate the transport(s) 70 as described above.

The sweeps 74 are sized and shaped such that as the sweeps 74 are rotated along the length of the feederhouse 38 below and between the first and second guides 62 and 66, (i.e., through a lower portion of a full rotation of the transports 70) the sweeps 74 come in very close proximity to (e.g., 0.1-1.5 cm), and/or in contact with, the liner 78. Hence, harvested plant product entering the feederhouse 38 from the head unit(s) 34, via the ingress opening, is conveyed (e.g., swept, pushed and/or dragged) along the liner 78 and fed (e.g., swept and/or pushed) into the thresher 42 via the sweeps 74. Particularly, the sweeps 74 are sized and shaped such that sweeps 74 convey most or all (e.g., 70% to 100%) of the harvested plant product (and parts thereof, e.g., corn kernels) along the liner 78 and feed (e.g., sweep and/or push) most or all (e.g., 70% to 100%) of the harvested plant product (and parts thereof, e.g., corn kernels) into the thresher 42. Accordingly, commingling of plant product harvested from one particular plot (e.g., research or test plot) is prevented or significantly reduced. Said another way, as the sweeps 74 convey the harvested plant product along the liner 78 little or none (e.g., 0% to 10%) of the harvested plant product (or parts thereof, e.g., corn kernels) from a particular plot (e.g., research or test plot) are allowed to pass under the sweeps 74 and remain in the feederhouse 38 where such plant product remnants can subsequently be commingled with plant product subsequently harvested from a different (e.g., research or test plot). In various embodiments, in combination with the size and shape of the sweeps 74, the liner 78 can be sized and shaped to have a thickness that is structured and operable to reduce, and/or eliminate, the distance between sweeps 74 and liner such that most or all (e.g., 70% to 100%) of the plant product harvested from each particular plot (e.g., research or test plot) is conveyed along the liner 78 via the sweeps 74 such that 78 little or no (e.g., 0% to 10%) plant product remnants remain within the feederhouse 38, as described above.

The first guide 62 and the second guide 66 can be any device or apparatus structured and operable to engage (via friction, and/or interlocking contact) the transport(s) 70 such that the sweeps 74 mounted thereto are maintained in a constant orientation relative to the respective transports 70 (e.g., the sweeps 74 are maintained in a substantially orthogonal orientation (e.g., at approximately 90°) to the respective transport(s) 70. In various embodiments, wherein the transport(s) 70 comprise a pair of transports 70, the first guide 62 and the second guide 66 can be any device or apparatus structured and operable to engage (via friction, and/or interlocking contact) the transport(s) 70 such that the respective transport(s) 70 are rotated at the same speed, maintained substantially parallel with each other, and rotated in unison such that the sweeps 74 extending therebetween are maintained in a constant orientation relative to the respective transports 70 (e.g., the sweeps 74 are maintained in a substantially orthogonal orientation (e.g., at approximately 90°) to the respective transports 70. For example, in various embodiments, one or both of the first and second guides 62 and/or 66 can comprise one or more sprocket, channeled wheel (e.g., pulley), barrel, drum and/or roller. Similarly, the transports 70 can be any device or apparatus structured and operable to have the sweeps fixedly connected thereto and engage (via friction, and/or interlocking contact) the first guide 62 and the second guide 66 such that the respective transport(s) 70 are rotated around the first and second guides 62 and 66 as described above. For example, in various embodiments, the transport(s) 70 can comprise one or more chain, belt or cable. As exemplarily illustrated in the figures, in various embodiments, at least the first guide 62 can comprise a drum 62A operably connected to the drive source and having a pair of sprockets 62B disposed at opposing ends thereof. In such embodiment, the transport(s) 70 can comprise a pair of chains that are engaged (e.g., interlockingly contacted) by, and driven by, the sprockets 62B. In such embodiments, the second guide 66 can also comprise a freely rotating drum having sprockets disposed at opposing ends thereof around which the transports 70 are disposed, or alternatively can merely comprise a freely rotating cylindrical drum around which the transports 70 are disposed, or alternatively can comprises a freely rotating drum having channels formed in the ends thereof or channeled wheels disposed at the ends thereof around which the transports 70 are disposed.

Figure 2B:
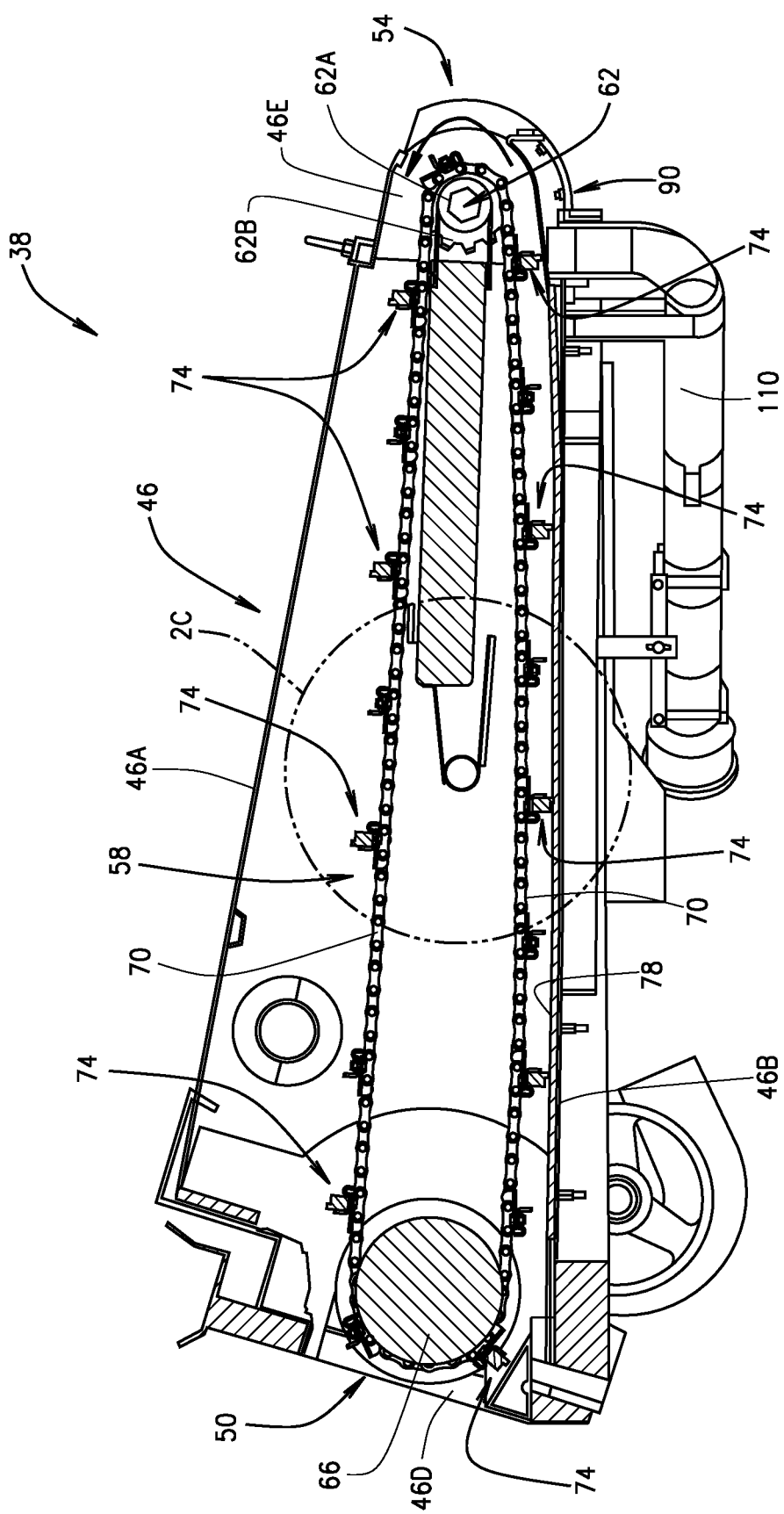
FIG. 2B is a cross-sectional view of the feederhouse, along line 2B-2B, shown in FIG. 2A exemplarily illustrating the at least one conveyor, in accordance with various embodiments of the present disclosure.
Figure 2C:
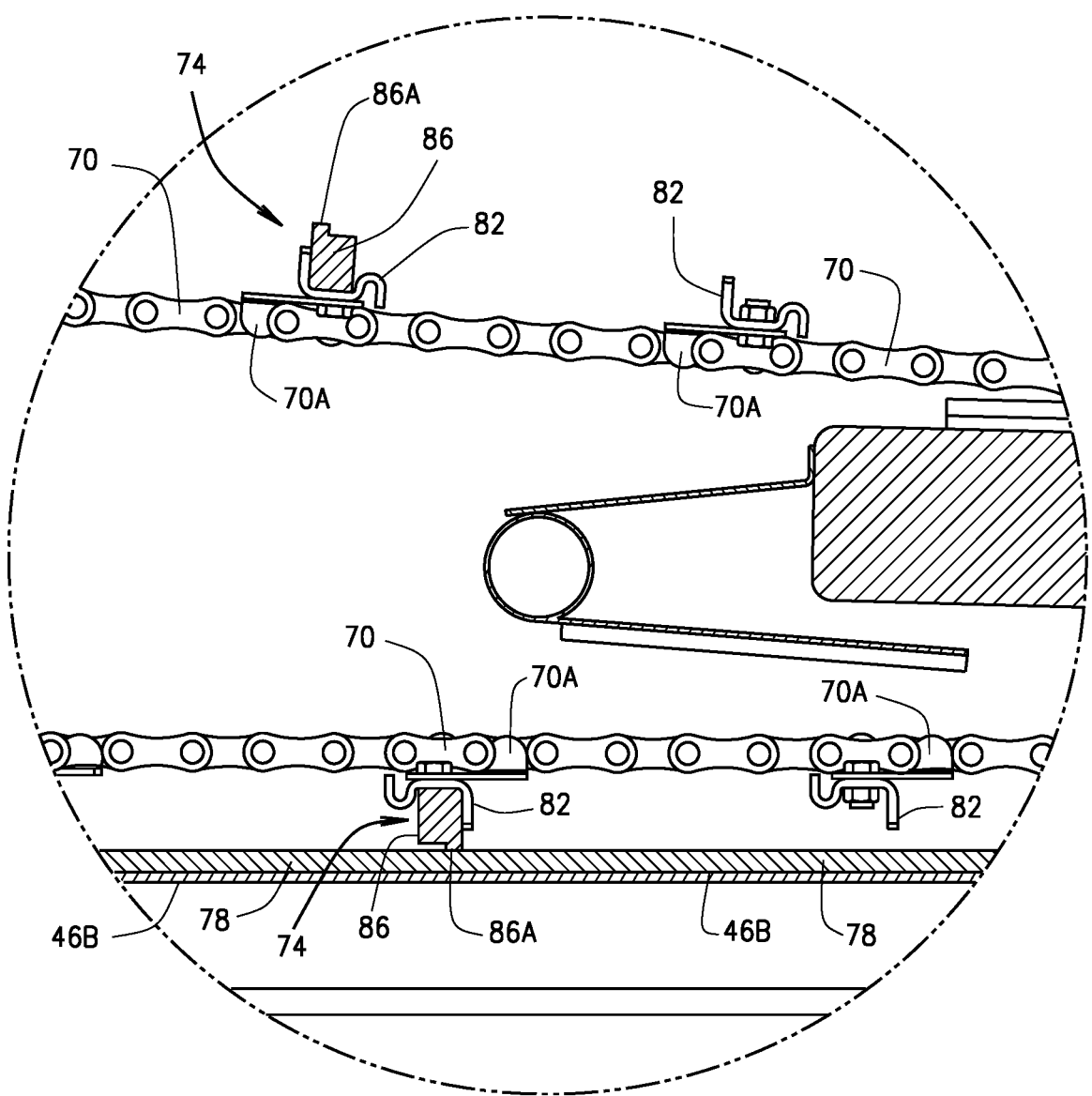
FIG. 2C is an expanded view of a portion of the feederhouse, conveyors and sweeps shown in FIG. 2B, in accordance with various embodiments of the present disclosure.
Figure 2D:
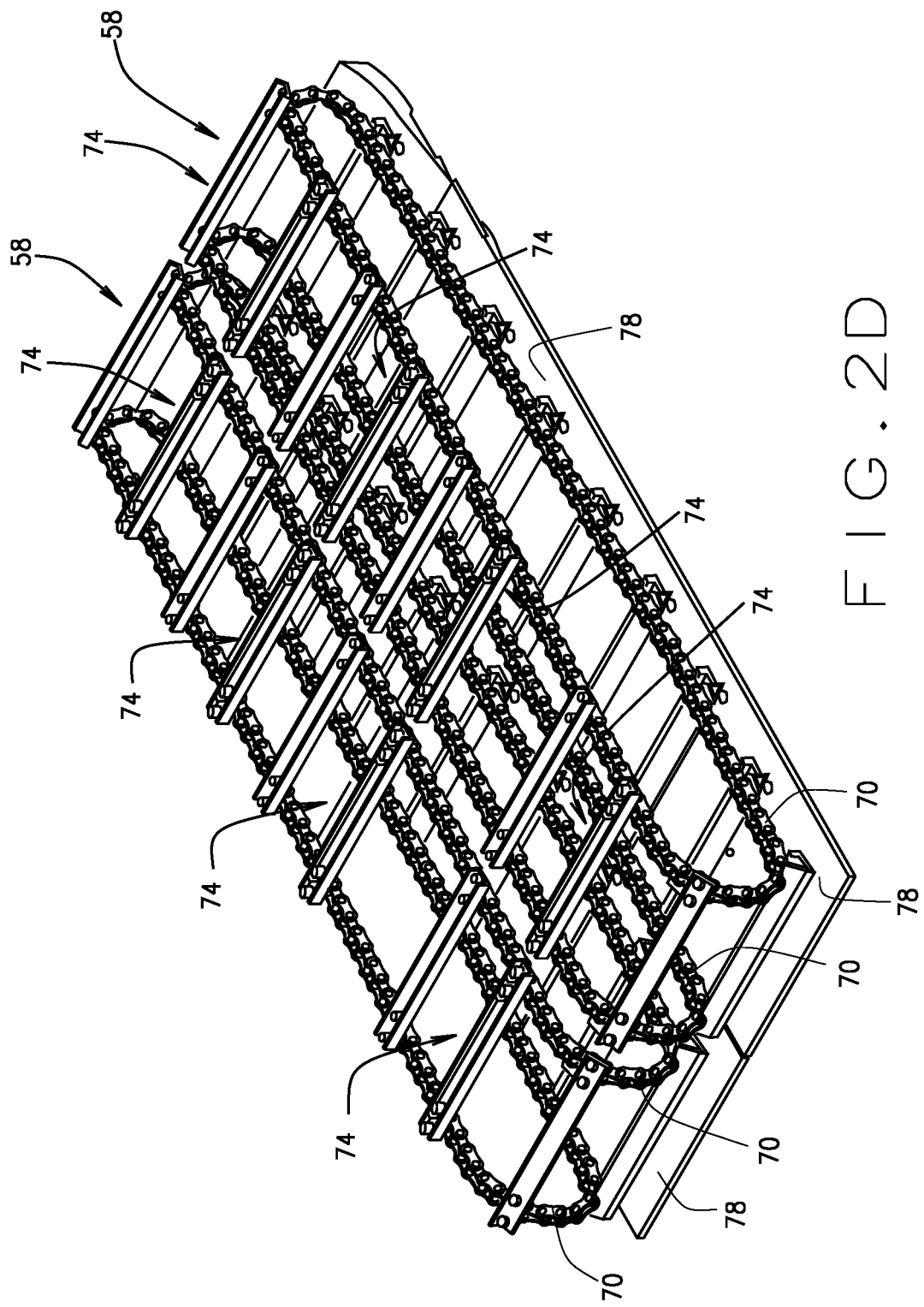
FIG. 2D is an isometric view a portion of the feederhouse shown in FIGS. 2A and 2B having an outer housing removed to show a pair of feederhouse conveyor systems, feederhouse liners, and feederhouse plenums, in accordance with various embodiments of the present disclosure.
Figure 3B:
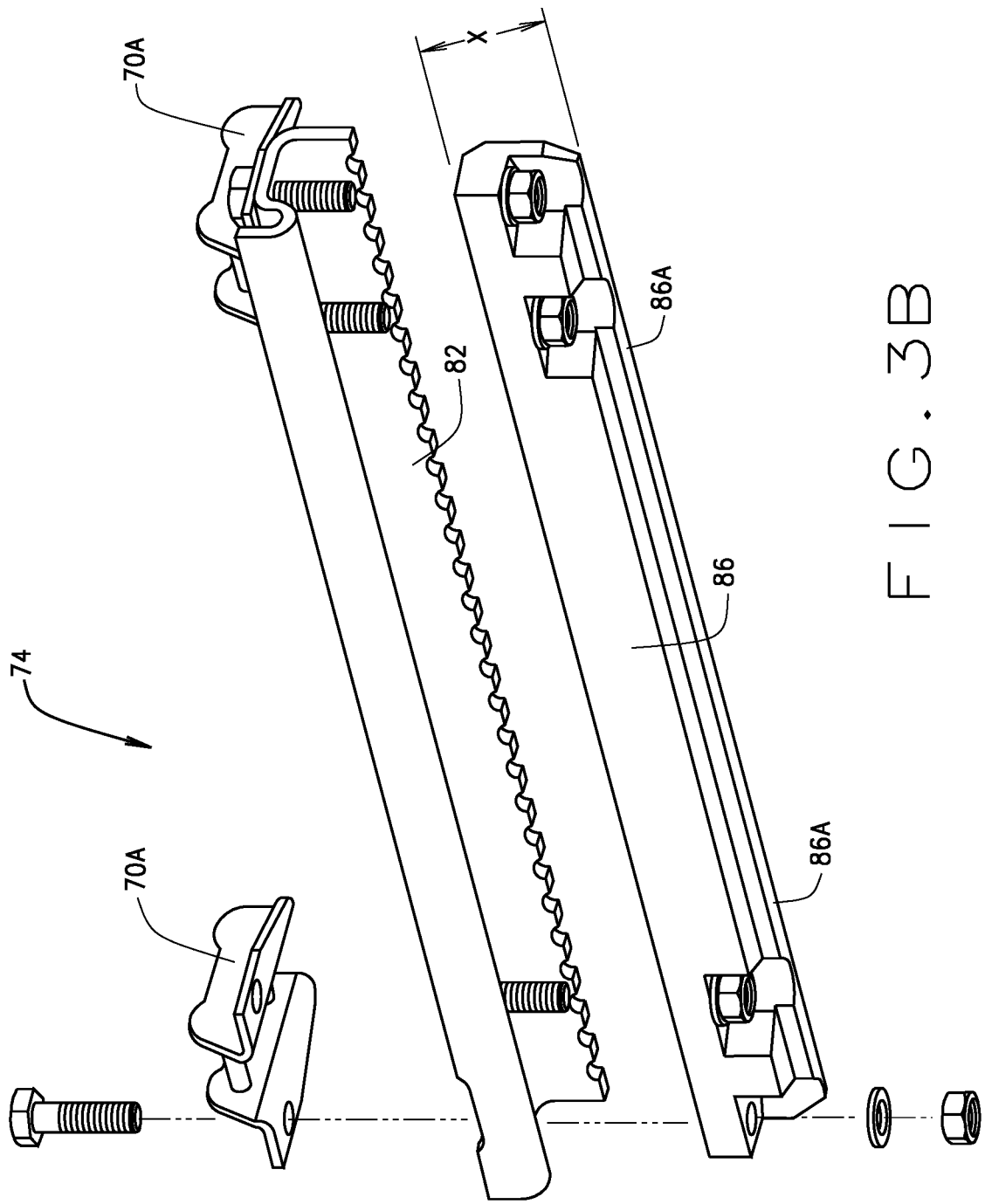
FIG. 3B is an exploded view of a plant product sweep shown in FIGS. 2A through 3A, in accordance with various embodiments of the present disclosure.

Referring now to FIGS. 2C, 3A and 3B, as described above, each conveyor system 58 includes one or more transport(s) 70. For exemplary purposes only the transport(s) 70 are illustrated and described as comprising a pair transports 70. Accordingly, in such exemplary embodiments, each conveyor system 58 includes a pair of transports 70 having a plurality of sweeps 74 disposed across and connected/secured to the transports 70. More specifically, in various embodiments, each sweep 74 is connected/secured at a first end to one of the transports 70 and connected/secured at an opposing second end to the other of the transports 70. The sweeps 74 can be connected/secured to the transports 70 using any suitable connecting/securing means or devices, such as clamps, nuts and bolts, rivet, screws, welding, soldering, etc. For example, in various embodiments wherein the transports 70 are chains, the sweeps can be connected and secured to the chain transports 70 using a bolt inserted through an aperture at the opposing ends of each sweep and through a hole in a modified chain link 70A as illustrated in FIGS. 3A and 3B. In various embodiments, each sweep 74 comprises a slat 82 disposed across the transports 70 and connected/secured at opposing ends to the transports 70, and a paddle 86 disposed across and mounted to the slat 82. In various embodiments, as exemplarily illustrated in FIGS. 3A and 3B, each slat 82 and corresponding paddle 86 can be combined and jointly and simultaneously connected/coupled to the transports 70 using the same connecting/securing means or device (e.g., using the same nuts and bolts).

As described above, each paddle 86 is sized and shaped to extend between the slat 82 and the liner 78 such that a distal edge 86A of the paddle 86 is in close proximity and/or contacts the liner 78 as the conveyor transports 70 move the respective sweep 74 through the lower portion of a full rotation of the transports 70. More specifically, each paddle 86 has an empirically determined and designed length X (e.g., 1.0-3.0 cm) that is selected such that as the first guide 62 rotates the transports 70 and sweeps 74 mounted thereto around and between and below the first and second guides 62 and 66 (i.e., through a lower portion of a full rotation of the transports 70), the distal edge 86A of the paddle 86 is in close proximity and/or contacts the liner 78. Therefore, due to the close proximity and/or contact of the paddle distal end 86 with the liner 78, most or all (e.g., 70% to 100%) of the harvested plant product (and parts thereof, e.g., corn kernels) entering the feederhouse 38 from the head unit(s) 34, via the ingress opening, is conveyed (e.g., swept, pushed and/or dragged) along the liner 78 and fed (e.g., swept and/or pushed) into the thresher 42 via the sweeps 74, such that commingling of remnants of plant product harvested from different plots (e.g., research or test plots) is prevented or significantly reduced. In various embodiments, each paddle can be fabricated from a low friction material such as an ultra-high molecular weight (UHMW) polyethylene.

Figure 4C:
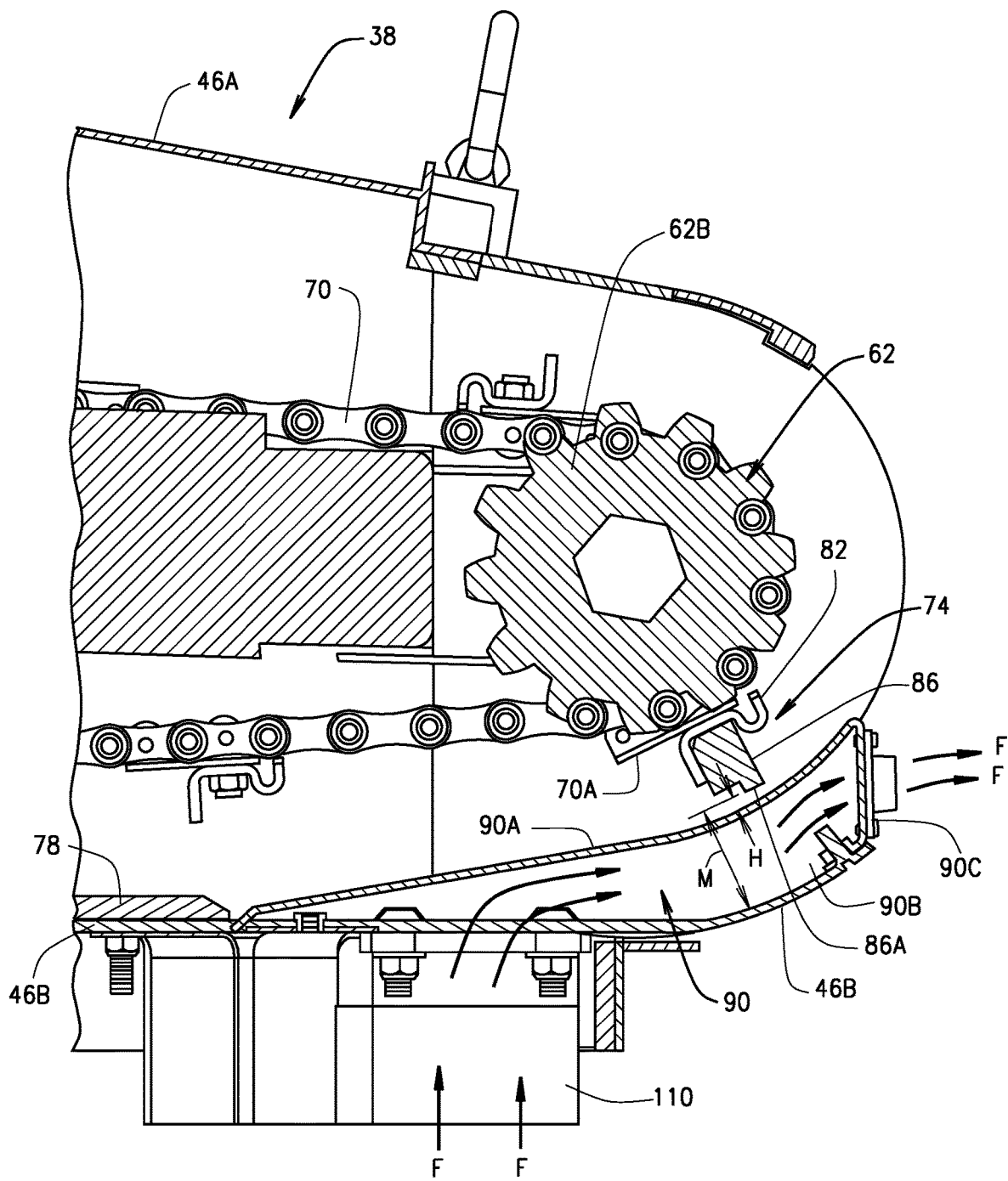
FIG. 4C is a cross-sectional view of a thresher end of the feederhouse including the plenum, in accordance with various embodiments of the present disclosure.

Referring now to FIGS. 1 through 4D, in various embodiments, the feederhouse 38 can include a curved plenum 90 that is disposed within the feederhouse outer body 46, and connected to a thresher end of the feederhouse outer body bottom 46B adjacent the first guide 62 (or the second guide 66 if it is disposed at the thresher end 46E of the feederhouse outer body 46), as exemplarily illustrated in FIGS. 2B, 4C and 4D. In the various embodiments wherein the feederhouse 38 includes the liner 78, the plenum is disposed on and connected to the outer body bottom 46B at a distal of the liner 78. The plenum 90 comprises a curved top 90A, a pair of opposing sides 90B connected to and supporting the curved top 90A, a distal end face 90C, and in various instances at least a portion of a bottom 90D. The plenum 90 is structured and operable to reduce and/or eliminate a space between the sweeps 74 and the interior surface of the bottom 46B at the outer body thresher end 46E. In various embodiments, the distal end face 90C of the plenum 90 comprises one or more (e.g., a plurality) of air output vents 94.

As exemplarily illustrated in FIG. 4C as each sweep 74 is rotated along the length of the feederhouse 38 adjacent the feederhouse bottom 46B, the paddle distal end 86A of each respective sweep 74 is a distance M (e.g., 2.0 to 10.0 cm) from feederhouse bottom 46B. The distance M will vary as each sweep 74 is rotated toward and around the first guide 62. As further illustrated in FIG. 4C, when the plenum 90 is disposed within the feederhouse 38, as each sweep 74 is rotated along the length of the feederhouse 38 adjacent the feederhouse bottom 46B (in various embodiments along the liner 78) and around the first guide 62, the paddle distal end 86A of each respective sweep 74 is a distance H (e.g., 0.0 to 1.0 cm) from the curved top 90A of the plenum 90. In various embodiments, the distance H will vary as each sweep 74 is rotated toward and around the first guide 62. However, in various embodiments, the plenum 90 is fabricated such that the curved top 90A has a curvature designed so that the paddle distal end 86A of each respective sweep 74 will maintain a substantially consistent distance H from the plenum curved top 90A as each sweep 74 is rotated toward and around the first guide 62 at the thresher end 46E of the feederhouse 38. Therefore, as each sweep 74 is rotated toward and around the first guide 62 the distance H between the paddle distal ends 86A and the plenum curved top 90A (e.g., 0.0 to 1.0 cm) will sweep or push most or all (e.g., 70% to 100%) of the plant product harvested from each particular plot (e.g., research or test plot) is conveyed along the plenum curved top 90A, via the sweeps 74, such that 78 little or no (e.g., 0% to 10%) plant product remnants remain within the feederhouse 38.

As described above, in various instances the plenum 90 comprises at least a portion of a bottom 90D. For example, in various embodiments, as exemplarily illustrated in FIG. 4A, the plenum 90 can have bottom portions 90D that cover only a portion of an underside 98 of the plenum, thereby leaving a portion of the underside 98 uncovered and an interior of the plenum 90 open, exposed and accessible, particularly fluidly accessible (e.g., airflow accessible). Alternatively, in various embodiments, the plenum 90 can comprise a full bottom 90D that covers the entire underside 98 of the plenum 90. As also described above, the plenum distal end face 90C comprises a plurality of air output vents 94. The air output vents 94 are structured and operable to allow and direct an airflow (described below) to flow from within the plenum interior to an exterior side of the plenum distal end face 90C. It is further described above that the feederhouse 38 is connected to the thresher 42 at the thresher end 46E of the feederhouse outer body 46. More particularly, as exemplarily illustrated in FIG. 4D, the feederhouse 38 the thresher end 46E of the feederhouse outer body 46 is connected to a thresher housing 42A. As further exemplarily illustrated in FIG. 4D, in various embodiments, when the feederhouse outer body 46 is connected to the thresher housing 42A there is an interface gap 102 formed between the feederhouse outer body thresher end 46E and the thresher housing 42A, in which plant product can fall as the plant product is conveyed, via the conveyor system(s) 58, from the feederhouse 38 into the thresher 42, via the feederhouse egress opening 54.

To prevent plant product from falling into the interface gap 102, in various embodiments the plant product harvest and transport system 30 further comprises one or more air generator(s) 106 that is/are fluidly connected with the interior of the plenum 90. The air generator(s) 106 can be mounted in any suitable location of the plant product harvest and transport system 30 and/or the plant harvesting machine 10. For example in various embodiments, the air generator(s) 106 can be mounted to the feederhouse outer body 46. The air generator(s) 106 is/are structured and operable to generate a positive airflow F that is directed and forced into the plenum interior via one or more air duct(s) 110. For example, in various instances wherein the plenum bottom 90D only partially covers the plenum underside 98, the air duct(s) 110 is fluidly connected with the plenum interior via one or more hole(s) in the feederhouse outer body bottom 46B at the thresher end 46E of the feederhouse 38. In such instances, the air generator(s) 106 can be operated to generate the airflow F that is directed and forced into the plenum interior, whereafter the airflow F flows through the plenum interior and is directed and forced out the plenum air output vent(s) 94. Therefore, during operation of the plant product harvest and transport system 30, plant product being conveyed from the feederhouse 38 into the thresher 42 will be blown across, and prevented from falling into, the interface gap 102 by the airflow F.

Alternatively, in various instances wherein the plenum bottom 90D covers the entire underside 98 of the plenum 90, the bottom 90D and/or one or more of the sides 90B can comprise one or more aperture formed therein, and the air duct(s) 110 can be fluidly connected with the plenum interior via one or more hole in the feederhouse outer body bottom 46B and/or sides 46C at the thresher end 46E of the feederhouse 38 that is/are aligned with the aperture(s) formed in the plenum bottom 90D and/or sides 90B. In such instances, the air generator(s) 106 can be operated to generate the airflow F that is directed and forced into the plenum interior via the one or more apertures, whereafter the airflow F flows through the plenum interior and is directed and forced out the plenum air output vent(s) 94. Therefore, during operation of the plant product harvest and transport system 30, plant product being conveyed from the feederhouse 38 into the thresher 42 will be blown across, and prevented from falling into, the interface gap 102 by the airflow F.

The air output vent(s) 94 (which in various instanced can include one or more louver) can be structured and operable to direct the airflow F in any desired direction as the airflow F exits the plenum interior that suitable to prevent plant product from falling into the interface gap 102. For example, the air output vent(s) 94 can comprise at least one air output vent structured and operable to direct the airflow F across the interface gap 102 downward toward a bottom of the thresher housing 42A, and/or at least one air output vent structured and operable to direct the airflow F across the interface gap 102 upward into the thresher 42, and/or at least one air output vent structured and operable to direct the airflow F across the interface gap 102 along and interior surface of the bottom of the thresher housing 42A, and/or at least one air output vent structured and operable to direct the airflow F sideways toward sides of the thresher housing 42A, thereby blowing or forcing the plant product across the interface gap 102 and into the thresher 42, hence, preventing plant product from falling into the interface gap 102. Additionally, the air output vent(s) 94 (which in various instanced can include one or more louver) can be structured and operable to direct the airflow F in any desired direction as the airflow F exits the plenum interior that is suitable to wash stagnating grain from corners and previously dead air zones, in addition to the interface gap 102, in the transition between the feederhouse egress and the thresher ingress. For example, the airflow F from the plenum 90 vent(s) 94 can levitate the grain that may tend to settle in the dead air zones of this transition so that the grain is sucked into the thresher 42, by the thresher generated airflow, from its ingress to its egress. This assists in preventing intermixing of harvested plant product from separate plots by keeping grain flowing through the transition without stagnation of small quantities in dead air zones such as the interface gap 102.

The air generator(s) 106 can be any air generator(s) structured and operable to provide the airflow F having any desired positive airflow pressure as the airflow F exits the air output vent(s) 94. For example, in various embodiments, the air generator(s) 106 can be centrifugal blower(s) that is/are mounted to the side of the feederhouse outer body 46, wherein the centrifugal blower is structured and operable to provide a large air flow rate with low pressure. Moreover, in various embodiments, the air generator(s) 106 can be controllable to vary the positive airflow pressure as the airflow F exits the air output vent(s) 94 in accordance with the particular use, conditions and implementation of the plant product harvest and transport system 30. For example, the air generator(s) 106 can be controllable to vary the positive airflow pressure as the airflow F exits the air output vent(s) 94 based on the environmental conditions in which the plant product plant and transport system 30 is utilized (e.g., humidity, temperature, altitude, terrain, etc.), and/or the particular plant product being harvested (e.g., grain, seed or other plant product exemplarily including oilseeds cereals and legumes such as wheat, corn, rye, soybeans, sorghum, oats, rice, millet, canola, etc.), and/or the structure condition and/or traits and/or the amount of the respective plant product being harvested (e.g., oil or moisture content of the plant product, the weight of the plant product, the size of the plant product, etc.). It is envisioned that in various embodiments the plant product harvest and transport system 30 can include one or more sensor structured and operable to sense such things as the environmental conditions, the particular plant product being harvested, and/or the structure condition and/or traits of the respective plant product being harvested and automatically adjust the pressure and flow rate of the airflow F to direct the respective plant product into the thresher 42 and prevent the respective plant product from falling into the interface gap 102.

Additionally, it is envisioned that in various embodiments, the pressure and flow rate of the airflow F can be prescribed based on the location of plant harvesting machine 10. For example, in various embodiments the plant product harvest and transport system 30 can include a global positioning system (GPS) such that the plant harvesting machine 10 can be GPS tracked as it moves through a field (e.g., a test or research plot) and enters a plot (e.g., a test or research plot) of plants having a certain characteristic, and automatically adjust the pressure and flow rate of the airflow F. Or, in various embodiments, the various plots of plants (e.g., test or research plots) can assayed (e.g., data can be collected using an unmanned aerial vehicle (UAV) prior to harvesting the respective plots, and this data can be utilized to automatically control the pressure and flow rate of the airflow F output by the air generator 106.

As described above and exemplarily illustrated throughout the figures, each conveyor system 58 includes a plurality of sweeps 74 mounted to the respective one or more transport 70. As also described above, in various embodiments each sweep 74 comprises a slat 82 and a paddle 86, wherein the paddle 86 and the slat 82 can be combined then jointly and simultaneously connected/coupled to the transport(s) 70 using the same connecting/securing means or device (e.g., using the same nuts and bolts). Or, alternatively, the paddle 86 can be mounted to the slat 82 and the slat 82 can be connected to the transport(s) 70 using any suitable connecting/securing means or device (e.g., using the same nuts and bolts).

It is envisioned that in various embodiments, as exemplarily illustrated in the various figures, the conveyor systems 70 can be existing conveyor systems of an existing plant product harvesting machine feederhouse that includes an existing plurality of slats 82, whereby the paddles 86 of the present disclosure can be mounted to selected ones of the slats 82, or combined with selected ones of the slats 82 and jointly connected to the existing transports 70 (e.g., every other slat 82). It is further envisioned that in various embodiments, as exemplarily illustrated in the various figures, the feederhouse 38 can be existing feederhouse of an existing plant product harvesting machine that includes one or more existing conveyor system 58, whereby the liner(s) 78 of the present disclosure can be disposed across (and in various instances mounted to) the interior surface of the bottom of the existing feederhouse outer body. It is still further envisioned that in various embodiments, as exemplarily illustrated in the various figures, the feederhouse 38 can be existing feederhouse of an existing plant product harvesting machine that includes one or more existing conveyor system 58, whereby the plenum(s) 90 of the present disclosure can be disposed in the thresher end 46E of the existing feederhouse as described above. More particularly, it is envisioned that in various embodiments, an existing plant product harvesting machine can be retrofitted with the plant product harvest and transport system 30 in accordance with the description set forth above. More specifically, the feederhouse of an existing plant product harvesting machine can be retrofitted with the paddles 86 and/or the liner(s) 78, and/or plenum(s) 90 in accordance with the description set forth above. It is further envisioned that in various instances a plant product harvesting machine can be manufactured new with the plant product harvest and transport system 30 in accordance with the description set forth above. More specifically, a plant product harvesting machine can be fabricate to include a feederhouse constructed and configured with the paddles 86 and/or the liner(s) 78, and/or plenum(s) 90 in accordance with the description set forth above.

Although the plant harvesting machine 10 has been exemplarily described as being implemented in association with the harvesting of corn, implementation of the plant harvesting machine 10 described above is not limited to corn. The plant harvesting machine 10, the plant product harvest and transport system(s) 30, and the various other systems, subsystems, structures, mechanisms, apparatus, devices, etc., of the plant harvesting machine 10 disclosed herein are equally applicable to use and implementation with various other grain, seed or other plant product exemplarily including oilseeds, cereals and legumes such as wheat, corn, rye, soybeans, sorghum, oats, rice, millet, canola, cotton, etc.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A feederhouse for a plant product harvesting machine, said feederhouse comprising:
   an outer body having:
      a head end connectable to a head unit of the harvesting machine, the head end comprising an ingress opening structured and operable to allow harvested plant product to pass from the head unit into the outer body; and
      an opposing thresher end connectable to a thresher of the harvesting machine, the thresher end comprising an egress opening structured and operable to allow plant product to pass from within the outer body into the thresher;
   a liner disposed across a bottom surface of the outer body; and at least one conveyor rotatably disposed within the outer body and structured and operable to convey harvested plant product received from the head unit via the ingress opening along the liner into the thresher via the egress opening, each of the at least one conveyor comprising:
      at least one conveyor transport;
      a plurality of plant product sweeps disposed across and connected to the at least one transport, the sweeps sized to contact the liner to convey plant product received from the head unit into the thresher; and
   a plenum disposed within the outer body at the thresher end, the plenum structured and operable to reduce a space between the sweeps and the bottom surface of the outer body thresher end, wherein the plenum comprises:
      a bottom and a pair of sides, at least one of the bottom and sides having at least one aperture therein that is connectable to an air generator; and
      a distal end face having at least one vent disposed therein that is structured and operable to direct a flow of air blown into an interior of the plenum via the air generator in a desired direction as the air exits the plenum interior.

2. The feederhouse of claim 1, wherein each sweep comprises:
   a slat disposed across and connected to the at least one transport; and
   a paddle disposed across and mounted to the slat, the paddle sized and shaped to extend between the slat and the liner to contact the liner as the at least one conveyor transport moves the respective sweep through a lower portion of a full rotation of the at least one transport, thereby conveying plant product received from the head unit into the thresher.

3. The feederhouse of claim 2, wherein at least one of the liner and the paddles are fabricated of a low friction, abrasion resistant material.

4. The feederhouse of claim 3, wherein the low friction, abrasion resistant material comprises a ultra-high molecular weight polyethylene.

5. A plant product harvest and transport system for a plant product harvesting machine, said system comprising:
   a head unit structured and operable to harvest plant product from plants growing in a field;
   a thresher structured and operable to receive the harvested plant product and remove plant product seed from the remainder of the harvested plant product; and
   a feederhouse structured and operable to convey the harvested plant product from the head unit to the thresher, said feederhouse comprising:
      an outer body having:
         a head end connected to the head unit, the head end comprising an ingress opening structured and operable to allow the harvested plant product to pass from the head unit into the outer body; and
         an opposing thresher end connected to the thresher, the thresher end comprising an egress opening structured and operable to allow plant product to pass from within the outer body into the thresher;
      at least one conveyor rotatably disposed within the outer body and structured and operable to convey the harvested plant product received from the head unit via the ingress opening through the feederhouse into the thresher via the egress opening, each of the at least one conveyor comprising:
         at least one conveyor transport; and
         a plurality of plant product sweeps disposed across and connected to the at least one transport, the sweeps sized to convey plant product received from the head unit into the thresher; and
      a plenum disposed within the outer body at the thresher end, the plenum structured and operable to reduce a space between the sweeps and a bottom surface of the outer body thresher end, wherein the plenum comprises:
   a bottom and a pair of sides, at least one of the bottom and sides having at least one aperture therein that is connectable to an air generator; and
   a distal end face having at least one vent disposed therein that is structured and operable to direct a flow of air blown into an interior of the plenum via the air generator in a desired direction as the air exits the plenum interior.

6. The system of claim 5, further comprising a liner disposed across the bottom surface of the outer body.

7. The system of claim 6, wherein each sweep comprises:
   a slat disposed across and connected to the at least one transport; and
   a paddle disposed across and mounted to the slat, the paddle sized and shaped to extend between the slat and the liner to contact the liner as the at least one conveyor transport moves the respective sweep through a lower portion of a full rotation of the at least one transport, thereby conveying plant product received from the head unit into the thresher.

8. The system of claim 7, wherein at least one of the liner and the paddles are fabricated of a low friction, abrasion resistant material.

9. The system of claim 8, wherein the low friction, abrasion resistant material comprises a ultra-high molecular weight polyethylene.

10. A plant product harvesting machine, said machine comprising:
   at least one plant product seed/chaff separation system structured and operable to segregate plant product seed from plant product chaff; and
   at least one plant product harvest and transport system structured and operable to harvest the plant product and transport the harvested plant product to the at least one seed/chaff separation system, each plant product harvest and transport system comprising:
      a head unit structured and operable to harvest plant product from plants growing in a field;
      a thresher structured and operable to receive the harvested plant product and remove plant product seed from the remainder of the harvested plant product; and
      a feederhouse structured and operable to convey the harvested plant product from the head unit to the thresher, said feederhouse comprising:
         an outer body having:
            a head end connected to the head unit, the head end comprising an ingress opening structured and operable to allow the harvested plant product to pass from the head unit into the outer body; and
            an opposing thresher end connected to the thresher, the thresher end comprising an egress opening structured and operable to allow plant product to pass from within the outer body into the thresher;
         a liner disposed across a bottom surface of the outer body; and
         at least one conveyor rotatably disposed within the outer body and structured and operable to convey the harvested plant product received from the head unit via the ingress opening along the liner into the thresher via the egress opening, each of the at least one conveyor comprising:
            at least one conveyor transport; and
            a plurality of plant product sweeps disposed across and connected to the at least one transport, the sweeps sized to contact the liner to convey plant product received from the head unit into the thresher; and
         a plenum disposed within the outer body at the thresher end, the plenum structured and operable to reduce a space between the sweeps and the bottom surface of the outer body thresher end, wherein the plenum comprises:
            a bottom and a pair of sides, at least one of the bottom and sides having at least one aperture therein that is connectable to an air generator; and
            a distal end face having at least one vent disposed therein that is structured and operable to direct a flow of air blown into an interior of the plenum via the air generator in a desired direction as the air exits the plenum interior.

11. The machine of claim 10, wherein each sweep comprises:
   a slat disposed across and connected to the at least one transport; and
   a paddle disposed across and mounted to the slat, the paddle sized and shaped to extend between the slat and the liner to contact the liner as the at least one conveyor transport moves the respective sweep through a lower portion of a full rotation of the at least one transport, thereby conveying plant product received from the head unit into the thresher.

12. The machine of claim 11, wherein at least one of the liner and the paddles are fabricated of a low friction, abrasion resistant material.

13. The machine of claim 12, wherein the low friction, abrasion resistant material comprises a ultra-high molecular weight polyethylene.

* * * * *